(12) United States Patent
Fleischman

(10) Patent No.: US 7,613,467 B2
(45) Date of Patent: Nov. 3, 2009

(54) GEO-CAST SYSTEMS AND METHODS

(75) Inventor: Eric W. Fleischman, Issaquah, WA (US)

(73) Assignee: The Boeing Company, Chicago, IL (US)

( * ) Notice: Subject to any disclaimer, the term of this patent is extended or adjusted under 35 U.S.C. 154(b) by 321 days.

(21) Appl. No.: 10/698,800

(22) Filed: Oct. 31, 2003

(65) Prior Publication Data

US 2005/0096065 A1    May 5, 2005

(51) Int. Cl.
*H04W 24/00* (2009.01)

(52) U.S. Cl. ............... 455/456.1; 455/456.3; 455/41.2; 455/3.06; 370/352; 709/203

(58) Field of Classification Search ............ 455/414.3, 455/414.1, 455.3, 456.1, 404.2, 466, 456.3, 455/458, 41.2; 340/988, 995.13; 701/213, 701/207; 709/219, 206; 370/352
See application file for complete search history.

(56) References Cited

U.S. PATENT DOCUMENTS

| | | | | |
|---|---|---|---|---|
| 5,802,492 | A * | 9/1998 | DeLorme et al. | 455/456.5 |
| 5,959,577 | A * | 9/1999 | Fan et al. | 342/357.13 |
| 6,052,591 | A * | 4/2000 | Bhatia | 455/445 |
| 6,091,956 | A * | 7/2000 | Hollenberg | 455/456.5 |
| 6,115,611 | A * | 9/2000 | Kimoto et al. | 455/456.3 |
| 6,169,897 | B1 * | 1/2001 | Kariya | 455/456.3 |
| 6,456,854 | B1 * | 9/2002 | Chern et al. | 455/457 |
| 6,470,181 | B1 * | 10/2002 | Maxwell | 455/413 |
| 6,522,875 | B1 * | 2/2003 | Dowling et al. | 455/414.3 |
| 6,580,916 | B1 * | 6/2003 | Weisshaar et al. | 455/456.1 |
| 6,625,460 | B1 * | 9/2003 | Patil | 455/466 |
| 6,629,136 | B1 * | 9/2003 | Naidoo | 709/219 |
| 6,650,902 | B1 * | 11/2003 | Richton | 455/456.3 |

(Continued)

FOREIGN PATENT DOCUMENTS

WO    WO 00/30379    5/2000

(Continued)

OTHER PUBLICATIONS

Dürr et al., "On a Location Model for Fine-Grained Geocast," Proceedings of the Fifth International Conference on Ubiquitous Computing: UBICOMP '03, Oct. 12, 2003, (XP002338360).

(Continued)

*Primary Examiner*—Sharad Rampuria
(74) *Attorney, Agent, or Firm*—Harness, Dickey & Pierce, P.L.C.

(57) ABSTRACT

A system and method for communicating with only a sub-quantity of mobile receivers operating within a geographic area that the sender wishes to communicate with, particularly for time critical messages. A system for geo-casting messages to at least one receiver within a geographic region is provided. The system includes an input for receiving the message and a circuit coupled to the input. Upon receiving the message, the circuit reads a geographic designator. Then the circuit accesses a geospatial database using the geographic designator whereby the circuit determines which receivers are in the geographic region designated by the geographic designator. From the geospatial database, the circuit also determines addresses for the receivers so that the circuit can individually forward the message to the receivers within the designated geographic region.

18 Claims, 3 Drawing Sheets

U.S. PATENT DOCUMENTS

| | | | | |
|---|---|---|---|---|
| 6,748,225 B1 * | 6/2004 | Kepler | ............... | 455/456.2 |
| 6,766,245 B2 * | 7/2004 | Padmanabhan | ............... | 701/207 |
| 6,785,551 B1 * | 8/2004 | Richard | ............... | 455/456.1 |
| 6,834,195 B2 * | 12/2004 | Brandenberg et al. | ............... | 455/456.3 |
| 6,879,835 B2 * | 4/2005 | Greene et al. | ............... | 455/456.1 |
| 6,947,754 B2 * | 9/2005 | Ogasawara | ............... | 455/456.3 |
| 6,973,318 B2 * | 12/2005 | Jambhekar et al. | ............... | 455/456.1 |
| 7,366,157 B1 * | 4/2008 | Valentine et al. | ............... | 370/352 |
| 2003/0013466 A1 * | 1/2003 | Ahn | ............... | 455/466 |
| 2003/0060215 A1 * | 3/2003 | Graham | ............... | 455/456 |
| 2004/0203851 A1 * | 10/2004 | Vetro et al. | ............... | 455/456.1 |

FOREIGN PATENT DOCUMENTS

WO        WO 0030379 A1 *   5/2000

OTHER PUBLICATIONS

Ko et al., "Geocasting in Mobile Ad Hoc Networks: Location-Based Multicast Algorithms," Mobile Computing Systems and Applications, 1999, Proceedings WMCSA '99, Second IEE Workshop on New Orleans, LA, USA, Feb. 25-26, 1999, Loss Alamitos, CA, ISA, IEEE Comput. Soc, US. Feb. 25, 1999, pp. 101-110 (XP010323388).

Ko et al., "GeoTORA: A Protocol for Geocasting in Mobile-Ad Hoc Networks," Proceedings of th International Conference on Netowrk Protocols, Nov. 14, 2000, pp. 240-250 (XP002259985).

Ren et al., "Unicast Routing in Mobile Ad Hoc Networks: Present and Future Direction," Parallel and Distributed Computing, Applications and Technologies, 2003, PDCAT '2003, Proceedings of the Fourth International Conference on Aug. 27-29, 2003, Piscataaw, NJ, USA, IEEE, Aug. 24, 2003, pp. 340-344 (XP010661292).

* cited by examiner

GEO-CAST SYSTEMS AND METHODS

FIELD OF THE INVENTION

The present invention relates to telecommunication systems for mobile transceivers, and more particularly to geo-casting telecommunication systems (i.e., efficient communications to computers at a specific geographic location).

BACKGROUND OF THE INVENTION

Geo-casting allows an individual to communicate with others in a specific geographic area, and has been a long sought capability for a number of applications. For instance, motor carrier operators may wish to contact all of their drivers threatened by inclement weather to warn them of the approaching storm or to order that they seek shelter. For another example, emergency response officials may wish to contact all cell phone owners within the area of a disaster to relay instructions and to obtain information regarding the nature and scope of the emergency.

Prior art technologies fail to adequately provide geo-casting capability for several reasons. Broadcasting a message, for any one to receive, may compromise confidential or sensitive information. Moreover, some of the intended recipients may be out of reception range and may not receive the message. Even recipients within reception range may not receive the message due to noise, interference or other inabilities of the communication system to deliver the message (e.g. out of date addresses for mobile recipients). Multicasting, in contrast, might ensure that all intended recipients (and only the intended recipients) receive the message. However, the overhead and time required to set up a multi cast may prevent time critical messages from arriving in a timely fashion. The latter disadvantage being especially critical in real time applications subject to rapidly evolving conditions.

Additionally, the routing of real time communications may be impractical when the recipients may move relative to the area of interest. For instance, transmitting a message from a transmitter dedicated to the area of interest may still miss some intended recipients because the recipients may have moved out of range of the transmitter even within the area of interest because of interference from foliage, \land forms, buildings, or other obstructions. It also may inadvertently transmit to recipients outside of the area of interest. In the alternative, a recipient may have moved into the area unbeknownst to the sender, thus being overlooked for inclusion in the communication, particularly where the message is not broadcast.

Accordingly, a need exists for a telecommunications system that operates to better ensure that all intended recipients, and only the intended recipients, within a given geographic area receive specific messages.

SUMMARY OF THE INVENTION

The present invention provides a more reliable system and method for communicating with only those mobile receivers within a geographic area with which the sender wishes to communicate, particularly for time critical messages.

The capability to send messages to specific geographic locations ("geo-casting") is a generic data communications requirement common across many commercial systems, and particularly across many military command, control, communications, computers, intelligence, surveillance, and reconnaissance (C41SR) systems. For instance geo-casting may be beneficially employed during operations of the Future Combat Systems (FCS) and other military programs developed by the Boeing Company. In a geo-cast system, a field commander or intelligent agent can send messages to all relevant receivers within a defined geographic area instead of sending conventional messages directed to individuals or groups. For example, geo-casts allow all entities in a given location to receive common operating picture (COP) information; to receive situational awareness information; to receive alerts such as "the enemy has locked on to your location and is about to fire on you"; and to receive location specific commands such as "retreat immediately to a position across the river." Thus, Geo-casts fundamentally differ from multicasts because the membership of a geo-cast is dynamic (transitory) and defined by location, rather than organization, role, or function.

Historically, others have attempted to implement a geo-cast capability using the functions provided at the Open Systems Interconnect(OSI) architecture's network layer. Other historic approaches have been directory based. Both of these prior art approaches, though, have failed to provide adequate geo-casting systems. Network layer approaches have failed because IP addresses are overloaded to encode both identity and physical routing topology information. Accordingly, an approach operating at the network level generally relies on outdated, or rapidly changing, information: the physical topological addresses of the mobile recipients.

As the IP addresses are modified to reflect changing network topology information, the identity function becomes confused (i.e., it is unable to positively determine whether the entity now at address X is the same entity as previously at address Y). Thus, these approaches introduce security vulnerabilities to the communications. These approaches also become quite complex as other entities within the system also need to track the evolving IP addresses (that change in relationship to geographical movement). Likewise, the directory-based approaches have met with limited applicability because directories are poorly suited to store rapidly changing information, such as the potentially changing physical addresses of mobile recipients. Both systems also suffer from the difficulty of associating the routing topology information contained within the IP Address with specific geographical locations, since there is no necessary relationship between the two concepts.

In contrast, the system and method provided by the present invention may operate at the application layer. Additionally, embodiments and methods in accordance with the present invention may also use serial unicast communications instead of multicast communications. Moreover, the present invention may employ a location database to store recipient location information. The system may support both synchronous (e.g., real time) and asynchronous communications (e.g., store-and-forward such as electronic mail). It also supports database-authored alerts stemming from changing events associated with geography-related policies of the current mission. Accordingly, the present invention provides superior flexibility and scaling properties for arbitrarily large systems.

In one preferred embodiment, the present invention provides a system that includes recipient location reporting, a recipient location database and serial uni-casting of the messages. All devices within an autonomous system (e.g., an FCS brigade) systematically report three pieces of information to the recipient location database. These three pieces of information include the identity of the reporting device, the device's IP address, and the device's physical (geographical) location. This information is subsequently available to humans or intelligent agents who access that location database.

The device identity is a function of the identities used to identify devices within that system. In some systems it may be an IP Address, if the IP Addresses are stable within that system. In the alternative, host identity payloads (HIP) or distinguished names may also be used within that system.

For the physical location, GPS data obtained from GPS receivers on the various devices within the system may be reported. In the alternative, radio triangulation may be employed (as with the Small Unit Operations/Structural Awareness (SUO/SAS) or Soldier Level Integrated Communications Environment (SLICE) systems) to report, or obtain, the physical locations of the various devices.

In a preferred embodiment, the reporting interval may be random within a bounded time period. Random reporting prevents every device from reporting their locations simultaneously, thus ensuring timely updates of the location database. In another preferred embodiment, the various devices report their locations when their current location differs from their previously reported location by more than a pre-selected threshold distance.

Turning now to the location database itself, the location database may be used in conjunction with the Boeing Autometric Spatial Query Server (SQS™) or any other database which contains geospatial information defining the area where the recipients may be located. The SQS™ may be preferred because many geographic and topological interrogation functions are automated within SQS™. For instance, SQS™ relates location coordinates (e.g. map coordinates or longitude and latitude) with landforms and visa versa. Moreover the Boeing SQS™ supports queries in relationship with landforms or specific geographic locations. These queries include a wide variety of spatial operators to allow the user, for example, to query for information regarding everything within an arbitrarily shaped polygon or within a specified radius from a given point. For convenience the triad of information (recipient identity, location, and address) being reported by the recipients may be stored in the location database where subsequent queries may access the information.

As previously mentioned, the invention operates at the Open Systems Interconnect (OSI) Architecture application layer in order to geo-cast messages to the recipients. For instance, an intelligent agent performing the geo-cast function may receive a message from a user along with user instructions regarding the location that message should be sent to and how to deliver it (e.g. e-mail, instant messaging, etc). Here, the instructions regarding who should receive the message describes where the intended recipients are located, rather than their roles or addresses. Thus, for example the instruction may take a form such as: "deliver the message to all of the devices at the landing zone." The agent then makes a query to the location database to learn the IP Addresses of the devices within the designated geographic area.

Having thus obtained the addresses of the intended recipients, the agent sends the message using the requested protocol (e.g., chat, email, etc) to each of the devices known to the location database matching the (geographical) location criteria. The intelligent agent may be configured to use either "best effort" or "assured" delivery. In the former, the agent sends the message without tracking whether the message was received or not. In this case, the agent will ignore any message non-delivery reports returned by the routing system. Alternatively, assured delivery may be used. In this case, the agent tracks which of the targeted recipients had received the message and which did not. The agent will subsequently resend the message to the non-recipients, iterating the resending until the target recipient either receives the message or a resending-threshold maximum is attained. The agent may be notified of message reception by a number of ways including using a reliable transport layer protocol (e.g., TCP) or else by requiring an explicit delivery notification by the recipient at the application layer (i.e., request-reply messages). In environments supporting IP Addresses that change as the device moves relative to the rest of the routing topology, subsequent re-transmissions to that device may be associated with additional database or directory lookups to ascertain the current IP Address value of that mobile device.

In regard to the Mobile Ad Hoc Networking (MANET) environments, the present invention accommodates local or system-wide network outages caused by a variety of circumstances. By employing seeded caches to locally store system wide information, which would otherwise be obtained from the recipient location database, the present invention may compensate for the Manet based network availability limitations temporarily locally affecting location database accesses. Moreover, in another preferred embodiment, the present invention envisions using "request reply" formats for the set of unicast messages. Thus, recipients not returning a reply may be deemed to have not received the message, thereby enabling corrective action (e.g. repairing the network or delivering the message to the affected recipients in some other way).

In another preferred embodiment a message may be geo-cast without recourse to the location database by sending it to a particular router physically located within the geographic area of interest. In particular, the router may be a radio router such as the Joint Tactical Radio System (JTRS) Wideband Network Waveform (WNW). The hop count for the message sent from the target radio-router determines the topological radius of that transmission. For example, it may be limited to one, thereby limiting the geo-cast from the radio-router to only reach its adjacent neighbors.

In another preferred embodiment the present invention provides a system for geo-casting a message to receivers within a geographic region. The system includes an intelligent agent to receive the request to geo-cast a message and a geographic identifier associated with a location. The agent then looks up the devices within the geospatial database associated with the geographic identifier. In this manner, the agent learns the IP Addresses of the applicable receivers so that it may then forward the message to those receivers within the designated geographic region.

Additionally, a delivery method identifier may be associated with the message to indicate, to the circuit, the delivery method (i.e., specific application layer protocol) to use in forwarding the message. Moreover, the receivers and transmitters in accordance with the present invention may be mobile relative to the geospatial volume. In other preferred embodiments the circuit may operate at the OSI Architecture application layer and may forward the message by a serial unicast either with, or without, a reply request. As to the receivers, the receivers may possess either stable or changing IP addresses.

In another preferred embodiment the present invention provides a method of geo-casting a message to a plurality of receivers each having an independent IP address and a usually a unique location. Note that where two or more receivers have essentially identical locations (e.g., two laptop computers sitting side by side) the identity and the IP addresses serve to distinguish between the receivers. The method includes reporting the locations and IP addresses of the receivers to a location database, formulating a communication to a specific a geographic region, and identifying the receivers having locations within the geographic region either through queries to a location database or else via transmissions via a specific radio-router within that geographical area. Also, the method includes determining the addresses of the intended receivers having locations within the geographic region and transmitting the message, preferably via a serial uni-cast, to those receivers.

Additionally, the method may include accessing a geospatial database and comparing the locations of the receivers and the designated geographic region to identify the receivers within the geographic region. Moreover, the identification of the receivers and their addresses may occur at the OSI Architecture's application layer even if the receivers are mobile or their IP addresses change. Furthermore, the method may include transmitting the message with a reply request so that receivers, which do not receive the message may be identified, and therefore receive future retransmissions of that message.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
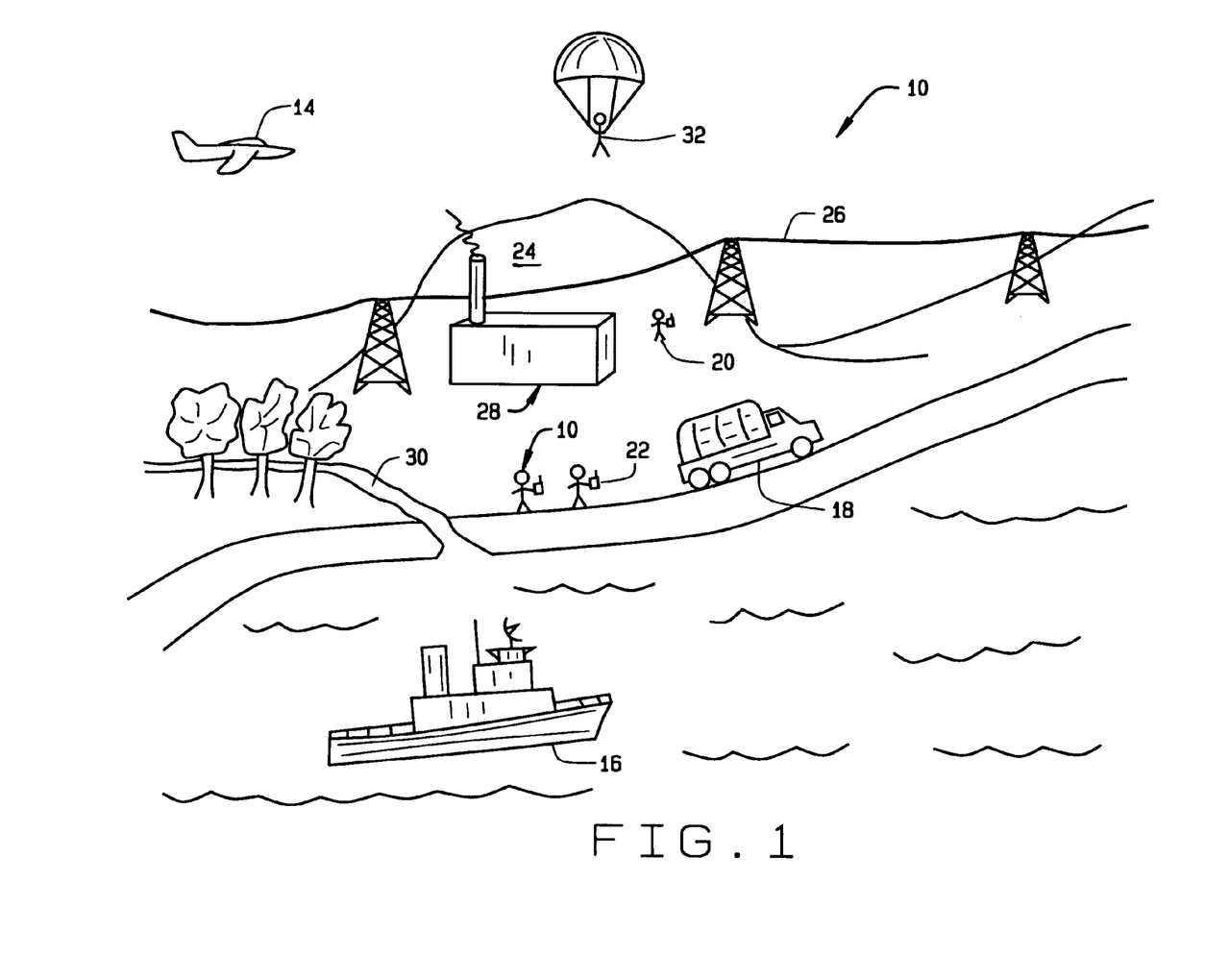
FIG. 1 is a perspective view of a geospatial volume in accordance with the principles of the present invention.

Turning now to FIG. 1, a geographic area is shown for which geospatial data has been recorded. Herein, geospatial data refers to information which defines the surface of the Earth (including areas above ground, underground, and under-water) and either man made or natural structures thereon. For instance the Boeing "Autometric Spatial Query Server" provides storage of, access to and retrieval of geospatial data and is offered by The Boeing Company of Chicago, Ill.

Included in the geographic area 10 are several pedestrian recipients 10 of messages, as well as recipients in a variety of vehicles including airborne recipients 14, waterborne recipients 16, and recipients onboard motor vehicles 18. Generally, one of the recipients may be in a position of authority, or be a central coordinator, for the other recipients. For instance, the pedestrian recipient 20 may be a commander of an army brigade. Moreover, the brigade may employ the Future Combat Systems concepts to enhance its effectiveness.

Since the recipient 20 is in charge of the other recipients, the recipient 20 may frequently need to send messages to the other recipients. Thus, the recipient 20 may also be a transmitter of messages. Though, any recipient may also transmit messages as desired. Accordingly, all of the recipients carry wireless devices 22 to transmit and receive messages from one and other. These wireless devices 22 may be radio transceivers, cellular phones, personal digital assistants, personal computers, or other electronic devices capable of receiving and transmitting messages between other similar devices preferably using Internet protocols (i.e., the TCP/IP family of protocols).

Accordingly, the devices 22 may be networked together to provide secure point-to-point, narrow cast, multi-cast, broadcast, or any type of electromagnetic communications. Moreover, the network may comply with the Open Systems Architecture reference model to facilitate communications between the recipients and even others.

In addition to the recipients, the geographic area 10 includes a number of natural and man made structures 24 and 28 respectively. Typically, the man made structures 28 include a wide variety of buildings, roadways, utility structures, and any other construction. Typically, the natural structures 24 include plains, hills, mountains, bodies of water, valleys, swamps, beaches, and any other terrain or naturally occurring objects. All of these structures 24 and 28 share the ability to allow reference to the structures in designating areas where recipients may be located at any given time.

For instance, since the recipients tend to be mobile, sub groupings of recipients may be viewed as being "on the mountain" 24, "above the power lines" 26, "near the factory" 28, or "east of the river" 30 for example. Thus, the natural and man-made structures represent useful, intuitive references by which certain transient groupings of the recipients may be identified (by designating geographic areas). Moreover, these geospatial areas may be arbitrarily shaped and may be in more than two dimensions. That is, the designated geographic area may include a height (e.g., elevation above or below the ground) as well as horizontal dimensions, thereby being a geographic volume.

For instance, a paratrooper 32 approaching the mountain 24 from above may be said to be in the geographic area designated by the description "on the mountain and above the power lines" because his longitude and latitude correspond to the mountain and his altitude is above the line between the base of the power line 26 towers. Accordingly, if an event has, or is about to occur, which may interest the recipients on the upper portion of the mountain 24, the paratrooper 32 may be vitally interested in learning of that event. Accordingly, a message sent to those recipients on the mountain and above the power lines may need to reach the paratrooper 32.

Accordingly, a user wishing to transmit a message may designate a geographic area (in two dimensions) or a volume (in three dimensions) by referencing structures of the geographic area 10. If the recipients are carrying GPS receivers, if their locations are being radio triangulated, or their location is otherwise known, the recipient may then be identified by virtue of the recipient's presence in the designated geographic area or volume.

Figure 2:
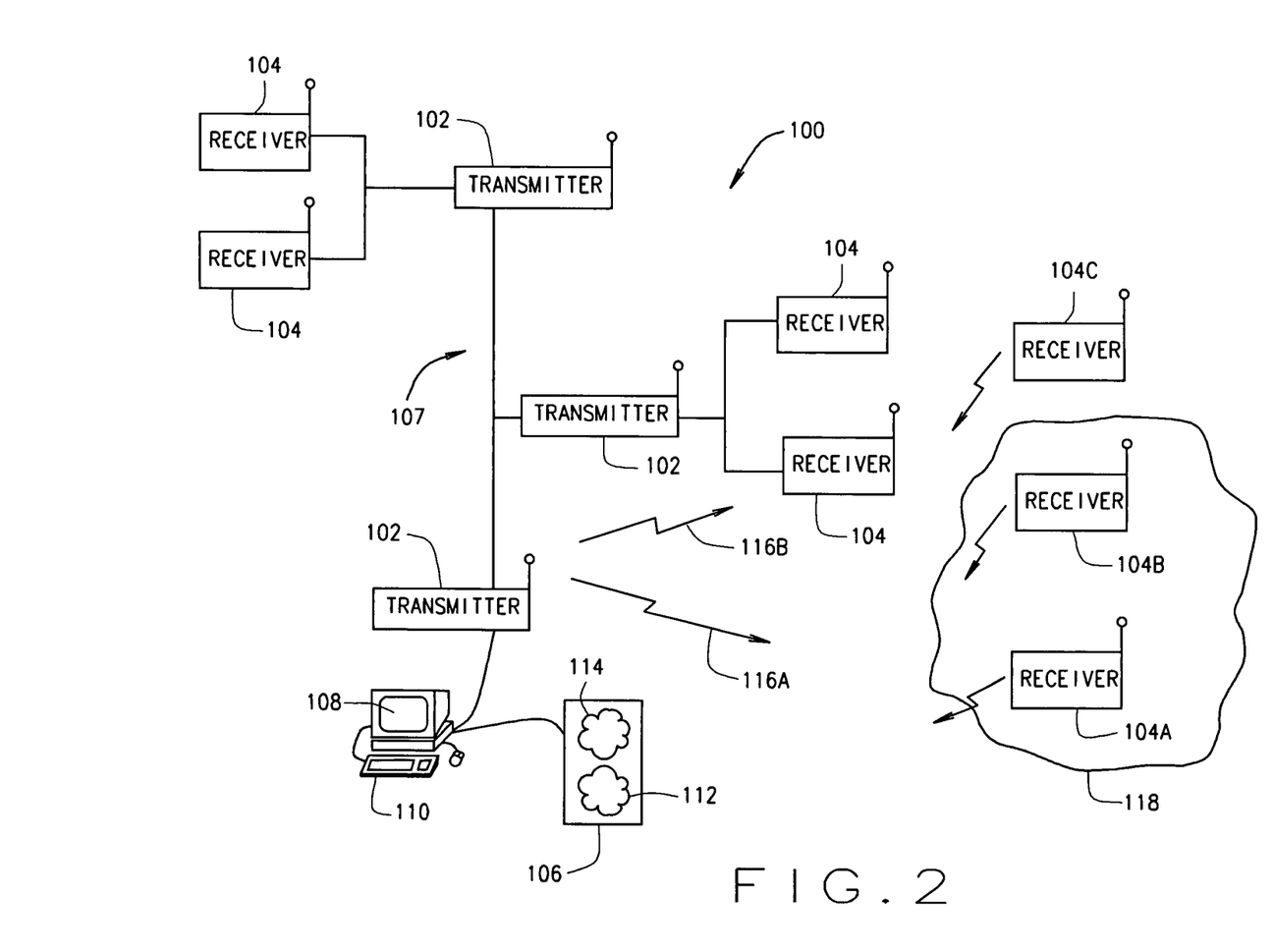
FIG. 2 is a schematic diagram of a system in accordance with a preferred embodiment of the present invention.

With reference now to FIG. 2, a schematic diagram of a system in accordance with a preferred embodiment of the present invention is shown. The system 100 includes at least one transmitter 102, at least one receiver 104, and a memory 106 in a network 107 of other transmitters and receivers. The network 107 may communicate via the Internet Protocol (IP) in conformance with traditional Internet protocol use (e.g., using the protocol system associated with the TCP/IP protocol suite). The transmitter 102 may include a graphic user interface (GUI) 108 and keyboard or other input 110 that is connected to a computer. The computer, also shown as 108, acts as an intelligent agent on behalf of the user. Within the memory 106, a geospatial information database 112 may reside. The memory 106 may be in any convenient location, but preferably may be co-located with the transmitter 102, be part of the transmitter 102, or be located in a secure environment, such as a military Tactical Operations Center (TOC).

The geospatial database 112 contains the available geospatial information which describes the geographic area 10 and at least the latest reported location, identity, and IP Addresses of the various receivers 104. Periodically the receivers 104 report their locations, identities, and IP addresses to the geospatial database on a frequency which may be selected by the user. Though, the reporting need not necessarily be periodic since it may alternatively occur when a receiver 104 moves from its previously reported position beyond a threshold distance.

When the user wishes to send a message to recipients within a designated geographical area he enters the message into the transmitter 102 via the GUI 108 or input device 110. Since, the transmitter 106 may be a multi media device, the message may be in any format including text, audio, graphics, or video. Also, the user may specify the delivery method (e.g., communications protocol at the OSI architecture application layer), which the system 100 will use to deliver the message.

Additionally, if the message is intended for a sub-group of all of the receivers 104 based on their location, the user designates the geographic region 118 in which the intended recipients 104 are located. For instance, the designated areas may be pre-selected and stored in the transmitter for display in a pop up menu on the GUI 108. Thus, the user may designate which of the pre-selected volumes with which to identify the intended recipients.

In the alternative, the GUI 108 may be configured to allow the user to designate structures within the geographic region 10 (see FIG. 1) which will define the designated geographical area 118. For instance, GUI 108 may include a touch screen display whereby the user may trace along the structures of the scene 10 displayed in real time by the GUI 108. Or the GUI may display a model based on the information regarding the geographic area 10 stored in the geospatial database 112 whereby the user may also trace along the structures of the scene 10 displayed on the GUI 108 to designate the geographic area 118.

With the geographic area 118 now designated the user also identifies the application-layer transmission protocol mechanism to be used to deliver the message (e.g., chat, email, etc.). With this information, the intelligent agent residing on the computer 108 accesses the geo-spatial database 112 within the memory 106 in order to ascertain the IP Addresses 104 of the devices within the selected geographic area 118. In this example, receivers 104A and 104B are within the geographic region 118 with receiver 104C notably being located outside of the geographic region 118.

The intelligent agent then constructs the message 116 using the user-provided application-layer protocol to serial unicast the message 116 to each of the devices. Here, serial unicast refers to a distinct message instance being created using the indicated application-layer protocol for each of the devices 104 located within area 118. For each device within area 118, an individual message is sent to the transmitter 102 using the application layer protocol that had been selected by the user. The transmitter 102 therefore relays each message over the existing network 107 (here the network 107, or communication infrastructure, may include an electromagnetic link) to the specified device 104 within the geographic area 118. Individual messages 116A and 116B, each targeted to a different device (104A, 104B) in area 118, are sent until all of the devices, which the geo-spatial database reported being in that area, had received an individual message that was uniquely addressed to their IP address.

Accordingly, using the IP Address of each of the identified receivers 104A and 104B, which were retrieved from the geospatial database 112, the transmitter transmits the message to the identified receivers 104A and 104B by any suitable route through the network 107 which can deliver the message 116 to the intended receivers 104A and 104B. Thus, the system 100 delivers messages to receivers 104, which were identified by geographic location, thereby geo-casting the message.

Figure 3:
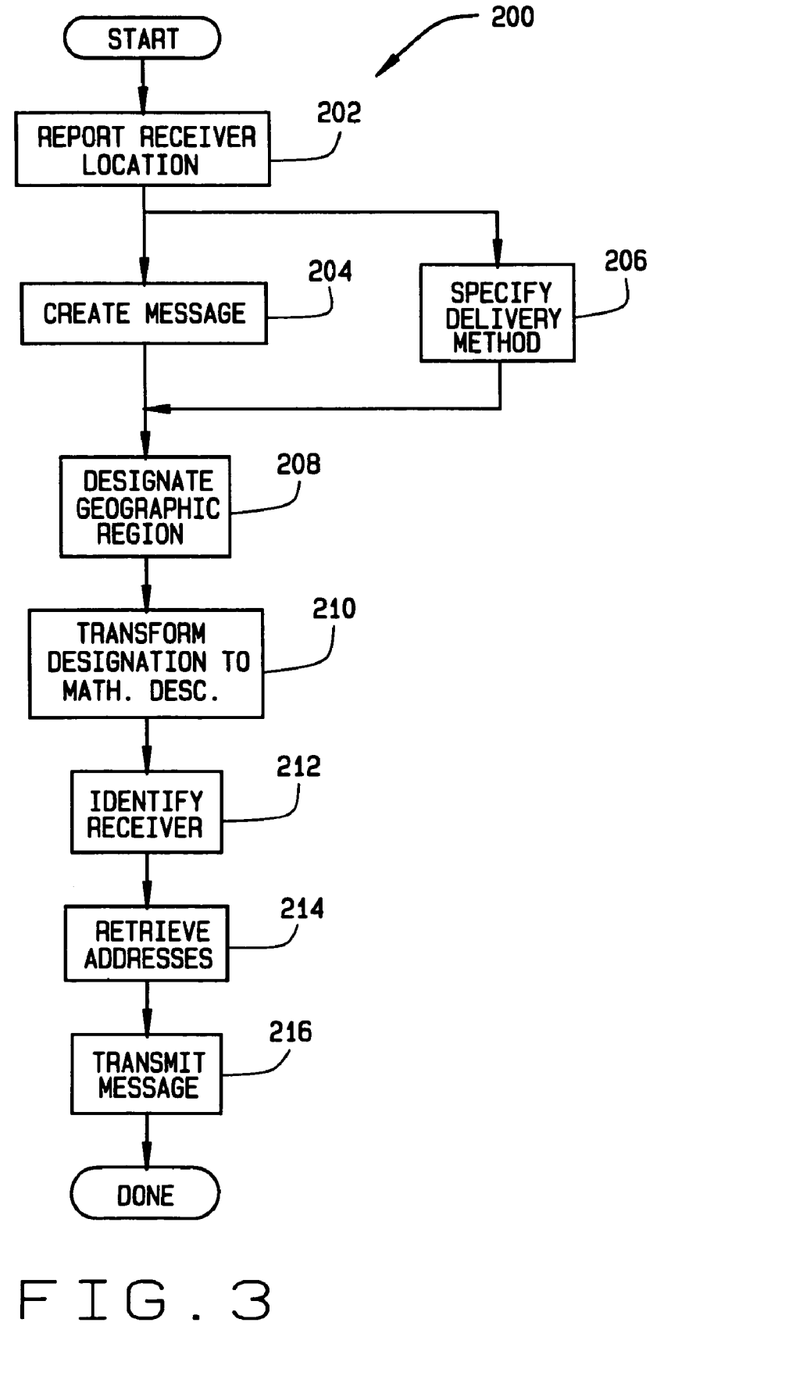
FIG. 3 is a flowchart of a method in accordance with the principles of the present invention.

With reference now to FIG. 3, a method of geo-casting messages in accordance with the present invention is shown. The method 200 includes each of the devices within the network reporting their geographic location as in step 202. At some subsequent time, the user creates a message that is intended to be transmitted to a subset of the devices based on the location of the devices. See step 204. A delivery method (i.e., a specification of an application layer protocol such as chat, electronic mail, voice or video message, etc.) may also be specified, or a default method may be used as illustrated by step 206.

The user also designates a geographic region in which the intended recipients may be found. See step 208. The designated geographic region is then transformed into a mathematical description of the region suitable for querying the geospatial database as in step 210. In a preferred embodiment the Boeing Autometric Spatial Query Server (SQS™) is used as the geospatial database. Because of the superior capabilities provided by the SQS™ step 210 is instead performed automatically during the geospatial database query, step 212, as opposed to separately in step 210. In step 212, the geospatial database is queried to learn the IP Addresses of the receivers which are located within the indicated location within the geospatial volume. Using the retrieved IP Addresses, the intelligent agent formulates a distinct message instance for each of the IP Addresses obtained in Step 214 and transmits a unique message for each of them in step 216. For example, if the query to the geospatial database in step 212 had resulted in the identification of three devices within the target geographical area, then three separate messages will be sent in step 216, one to each of three devices found within that area. If (as in the present example) the transmissions use IP communications, each of the transmissions will be to the IP Address of a specific device found within that geographical area.

The present invention thus provides a means to even more effectively provide messages to specific groups of individuals within a given two-dimensional (or three dimensional) geographic area. The present invention is not constrained by the limitations of prior developed systems which cope poorly with highly mobile receivers. In particular, the present invention provides an intuitive user interface for specifying the group of receivers to which a message will be geo-cast. Moreover, the present invention provides timely delivery of the geo-cast message to the intended receivers using already existing topology information currently known to the network. Thus, the present invention provides true geo-casting without the need for group membership setups and on-going group maintenance as the prior art requires.

While various preferred embodiments have been described, those skilled in the art will recognize modifications or variations which might be made without departing from the inventive concept. The examples illustrate the invention and are not intended to limit it. Therefore, the description and claims should be interpreted liberally with only such limitation as is necessary in view of the pertinent prior art.

What is claimed is:

1. A method of geo-casting a message to a plurality of recipients each having an address and a known geographic location, comprising:
reporting the current locations and addresses of the plurality of recipients to a geospatial database;
designating an arbitrary geographic region to transmit the message to by reference to a physical structure within the geographic region;
determining the addresses of the recipients that are located within the geographic region by using the geospatial database to compare the current reported locations of the recipients with the reference to the structure, the address of at least one of the recipients being an internet protocol (IP) address;
changing the wide area network address of the recipient to dynamically obtain a new IP address due to movement of the recipient; and
transmitting the message to the addresses of each of the recipients having current locations within the geographic region by serially unicasting the message, over a mobile ad hoc network,
operating a computer at an OSI application level.

2. The method according to claim 1, further comprising:
accessing a geospatial database and comparing the locations of the recipients and the designated geographic region.

3. The method according to claim 1, further comprising:
specifying a delivery method; and
transmitting the message according to the specified delivery method.

4. The method according to claim 1, wherein at least one of the recipients is mobile relative to the geographic region.

5. The method according to claim 1, wherein the transmitting the message further comprises requesting a reply, whereby recipients which do not receive the message may be identified.

6. The method according to claim 1, further comprising:
determining whether an event has occurred and, if the event has occurred, then transmitting the message being made in response to the event.

7. The method according to claim 6, wherein the event further comprises a reported location being across a border, the message being a border crossing warning, the geographic region designated within a predetermined distance from the border.

8. The method according to claim 1, wherein the message further comprises commercial information.

9. A telecommunication system comprising:
a mobile ad hoc network;
a transmitter connected to the network;
a memory containing a geospatial database and in communication with the transmitter;
a plurality of receivers including at least one mobile receiver, each of the plurality of receivers including a current address and a location in a geographic area and reporting the current address and the location to the geospatial database on a selected frequency; and
the transmitter enables reception of a message and a geographic destination designator that designates a geographic destination for the message, and further enables access to the geospatial database to identify the addresses of the receivers in the geographic destination to transmit the message to the identified receivers within that geographic destination based on the reported address for each said identified receiver, the geographic destination comprising a geographic region arbitrarily defined by reference to one or more physical structures within the geographic region, the transmitter enabling transmission of the message as a series of unicast messages to the identified receivers,
operating a computer at an OSI application level.

10. The telecommunication system according to claim 9, further comprising:
the transmitter enabling reception of a delivery method designator associated with the message, and transmission of the message according to the designated delivery method.

11. The telecommunication system according to claim 9, further comprising:
the message including a reply request, to enable any one of the receivers that does not respond to the reply request may to be identified.

12. The telecommunication system according to claim 9, further comprising:
the address of at least one of the receivers comprising a wide area network address which changes.

13. The telecommunication system according to claim 9, further comprising:
a processor for determining whether an event has occurred and, if the event has occurred, sending the message and geographic destination designator to the transmitter.

14. The telecommunication system according to claim 13, wherein the event further comprises a reported location being across a border, the border defining a boundary for the locations of the receivers, the message being a border crossing warning, and the geographic destination designator designating across the border.

15. The telecommunication system according to claim 9, wherein the message further comprises commercial information.

16. The telecommunication system according to claim 9, further comprising:
an intelligent agent operating within the network to access the geospatial database to identify the addresses of the receivers in the geographic destination.

17. A telecommunication system comprising:
a mobile ad hoc network;
a transmitter connected to the network;
a memory containing a geospatial database and in communication with the transmitter;
a plurality of receivers including at least one mobile receiver, each of the plurality of receivers including an address and a location within a geographic area and reporting the current address and the location of the mobile receiver to the geospatial database, at least one of the addresses being a wide area network address which changes; and the transmitter enabling operation at an OSI application level to receive a message and a geographic destination designator that designates an arbitrarily defined geographic destination for the message, the geographic destination defined by at least one physical structure in the geographic destination and that enables access to the geospatial database to identify the addresses of the receivers currently reported to be in the geographic destination, to transmit the message to the identified receivers within the geographic destination based on their reported current address, and that enables transmission of the message as a series of unicast messages to the identified receivers within the geographic destination,
operating a computer at an OSI application level.

18. A method of geo-casting a message to a plurality of recipients each having an address and a known geographic location comprising:
- reporting the current location and address of the recipients to a geospatial database;
- transmitting a message to at least one selected recipient based on their geographic location by:
  (1) arbitrarily designating a geographic region for receipt of the message by reference to a plurality of physical structures in the geographic region;
  (2) determining the recipients that are within the geographic region by comparing the current reported locations of the recipients to the geographic region; and
  (3) serially unicasting the message to the addresses of the recipients that are located within the geographic region over a mobile ad hoc network,
- operating a computer at an OSI application level.

* * * * *

UNITED STATES PATENT AND TRADEMARK OFFICE
CERTIFICATE OF CORRECTION

PATENT NO.        : 7,613,467 B2                               Page 1 of 1
APPLICATION NO. : 10/698800
DATED             : November 3, 2009
INVENTOR(S)       : Eric W. Fleischman It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 328 days.

Signed and Sealed this

Nineteenth Day of October, 2010

David J. Kappos
*Director of the United States Patent and Trademark Office*